US008018860B1

(12) United States Patent
Cook

(10) Patent No.: US 8,018,860 B1
(45) Date of Patent: Sep. 13, 2011

(54) NETWORK MAINTENANCE SIMULATOR WITH PATH RE-ROUTE PREDICTION

(75) Inventor: Fred S. Cook, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 3067 days.

(21) Appl. No.: 10/387,289

(22) Filed: Mar. 12, 2003

(51) Int. Cl.
*H04L 12/26* (2006.01)
(52) U.S. Cl. ...... 370/244; 370/218; 370/242; 379/29.02
(58) Field of Classification Search .......... 370/216–228, 370/242–245; 379/29.02
See application file for complete search history.

(56) References Cited

U.S. PATENT DOCUMENTS

| 6,108,300 | A | 8/2000 | Coile et al. | |
|---|---|---|---|---|
| 6,295,558 | B1 | 9/2001 | Davis et al. | |
| 6,477,483 | B1 * | 11/2002 | Scarlat et al. | 702/186 |
| 6,519,228 | B1 * | 2/2003 | Creamer et al. | 379/15.01 |
| 6,832,184 | B1 * | 12/2004 | Bleier et al. | 703/23 |
| 6,874,099 | B1 * | 3/2005 | Balasubramanian et al. | 714/4 |
| 2001/0038471 | A1 * | 11/2001 | Agrawal et al. | 359/110 |
| 2002/0097672 | A1 | 7/2002 | Barbas et al. | |
| 2003/0156549 | A1 * | 8/2003 | Binder et al. | 370/252 |
| 2004/0032857 | A1 * | 2/2004 | Tannan | 370/351 |

FOREIGN PATENT DOCUMENTS

| EP | 1073244 A1 * | 1/2001 |
|---|---|---|
| WO | WO 03039070 A2 * | 5/2003 |

OTHER PUBLICATIONS

Sai Kiran Reddy, G et al., "Reconfiguration based Failure Restoration in Wavelength-Routed WDM networks," Proceedings International Conference on Dependable Systems and Networks, 2000. Jun. 25, 2000. pp. 543-552.*
Thomas Heim, *Agilent Technologies, Meeting the Challenges of Integrated Networks*, Nov. 12, 2001, pp. 1-35.

* cited by examiner

*Primary Examiner* — Donald Mills

(57) ABSTRACT

Re-routing interactions are predicted for a communications network including a plurality of network elements. A respective device state image is constructed for each of the plurality of network elements, with each of the device state images including a failover setting of a respective one of the network elements. The device state images are transmitted to a network simulator. The performance of the communications network is simulated in response to the device state images. A prospective network element failover of a predetermined one of the network elements is transmitted to the network simulator. A performance of the communications network is simulated in response to the device state images modified by the prospective network element failover. It is then detected whether an acceptable performance is maintained in view of the prospective network element failover in order to identify whether is will be permissible to perform a maintenance action on the network element which makes it unavailable to the network.

14 Claims, 3 Drawing Sheets

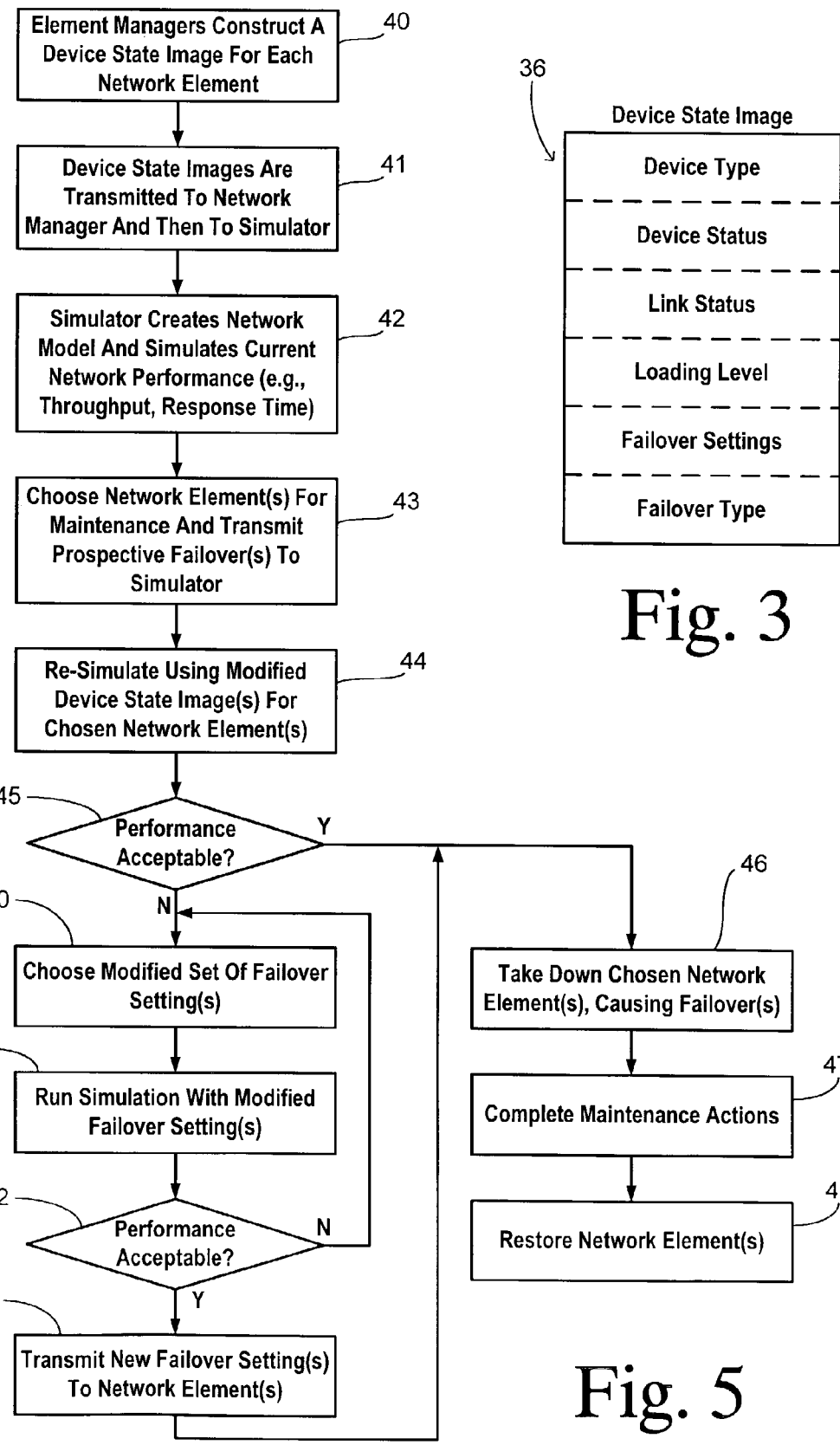

NETWORK MAINTENANCE SIMULATOR WITH PATH RE-ROUTE PREDICTION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to managing mixed-vendor, meshed communication networks, and, more specifically, to predicting re-route interactions in association with maintenance actions on network elements.

With the increasing complexity of communication networks, such as layered protocol networks (IP over ATM, or IP over Frame Relay) used with the Internet and synchronous optical networks (SONET) used in telephone networks, network management functions such as network element provisioning and configuration, load monitoring, and fault detection become increasingly important. Currently, network element management systems collect network element resource status via various management protocols including TL1, CMIP, CORBA, SNMP, and others. Network element resources may, for example, include routers, switches, servers, bridges, multiplexers, and other devices depending upon the type of network. The availability of element resource status allows external (i.e., management) systems to determine the load and utilization levels of the device, the fault state (or impending fault states), and current configurations. This collected information allows network service providers to perform the standard FCAPS (fault, configuration, accounting, performance, and security) functions associated with managing a network.

Recently, it has become more and more popular to relegate the control portion of the network element configuration function of FCAPS to a logically separate "control plane" system. In some cases, the control functionality is housed within the network element itself, and, in other cases, it is housed in near proximity to the network element. The control functionality is concerned principally with fulfilling explicit or implicit end-user requests (e.g., requests whose response time is clearly discernable by the end-user). These functions typically involve providing a transient connection or allocating processing or storage resources to a specific user request. Fault detection, correction, and restoration after failure of these resources are also typically handled by the control plane system.

Traffic load levels within a network impact the performance of all network elements. To maintain a reasonable system cost, networks are typically over-subscribed for their potential peak traffic rates. In other words, the available resources of the network could not support all possible requests that could potentially occur at the same time (e.g., the telephone network cannot support a situation where every telephone is in use simultaneously).

In a meshed network, each network element is connected to many other network elements so that network traffic can potentially reach its destination by many different paths. Due to the large size and complexity of most networks, network elements from a variety of vendors/manufacturers are typically present. Unfortunately, when pieces of the control functionality are shared across multiple vendors and/or element types, the restoration steps taken for a resource becomes unpredictable. Since the various vendors and/or network element types do not have an agreed upon standard method of restoration between themselves, restoration actions must be coordinated above the network element level to be rational and predictable. Restoration that is coordinated external to the network element level is frequently too slow to fall within the service level agreement (SLA) allowances.

When a failure of a network element or other error occurs making a communication path in a meshed network unavailable, the traffic that was being handled by a number of transport paths, x, must then be handled by x−1 paths. In an IP network, for example, the error correction action (i.e., re-convergence) automatically re-routes traffic paths over the remaining links after some amount of convergence time. This process, however, does not take SLA parameters into consideration when determining how paths are re-routed. Consequently, for a premium network service such as video conferencing, SLA requirements for a limited transport latency and/or jitter may be violated by the newly converged configuration and/or by the re-convergence action itself (e.g. re-convergence takes 10 minutes on an SLA budget that allows 5 minutes outage annually).

Some network elements attempt to lessen these problems by allowing an operator to provision a failover resource to take over as a backup when the main resource becomes unavailable. In that case, no communication is required between network elements when a failure occurs—network operation merely switches from the failed resource to the provisioned backup resource. Manual provisioning of failover resources is undesirable in a typical network, however, because thousands of network element resources are present and it burdensome to manually configure and/or reconfigure all these resources. In addition, providing a failover resource for each network element doubles the resource requirements (and cost) of the network, or configured failover resources are re-used which increases the likelihood that failover resources will already be in use when they are needed.

A typical method for reducing the number of resources required for failover protection is to provide one failover resource per each group of n resources, where n is the number of network element resources in a group to be served by one failover resource. This tremendously improves the resource utilization of the network, but has led to other problems. More specifically, when either 1) multiple network elements fail simultaneously, 2) operation of two or more network elements is suspended while performing maintenance actions on the network elements, or 3) a network element fails while another network element is down for maintenance, then multiple requests for the same failover resource can occur (e.g., two or more resources of the "n" group are out of service at the same time and traffic from both is switched to the same failover device). For instance, if two operators independently perform maintenance on two different resources in a network, it is possible that the re-routing generated by the out-of-service resources will failover to the same alternate resource at some point in the network. Furthermore, the number of nodes (i.e., elements), the number of connections between the nodes (i.e., links), and the number of virtual paths traversing the nodes prevents a network operator from understanding the likely interactions created as a result of any particular failover. As a result, network performance is degraded and may result in noncompliance with the provider's SLA, or worse yet, a cascade failure scenario.

There are currently network analysis tools (such as the Conscious™ traffic engineering system available from Zvolve Systems, Inc.) that will analyze element load levels and resource allocations based upon information retrieved from element management system data. These tools will then generate suggested resource allocation for any new requests, and they can be used to predict SLA violations for resource outages by adding requests for resources currently used by the failed element to a model of the network not including that element. Unfortunately, these tools do not predict what a network element will attempt to do when a failover occurs. This results in a situation where unpredicted and/or uncoordinated actions take place in a failure situation, and where the response to a failure situation is unacceptably slow (e.g., the network tool identifies an error and re-configures the network elements based upon its observations, in a process that takes from minutes to hours).

SUMMARY OF THE INVENTION

The present invention has the advantages that the effect of a link or device failure in a mixed-vendor, multi-node (typically a meshed) network is predicted and a network operator can know in advance whether a desired maintenance action is allowable given the current network loading, link, device status, and failover routing. Furthermore, failover settings for network elements can be better engineered to avoid undesirable re-routing interactions during maintenance or failure of network elements (i.e. failover routes are logically exercised to determine unacceptable re-use patterns and loading conditions).

In one aspect of the invention, a method is provided for predicting re-routing interactions in a communications network including a plurality of network elements. A respective device state image is constructed for each of the plurality of network elements. The device state images are transmitted to a network simulator. The performance of the communications network is simulated in response to the device state images. A prospective network element failure of a predetermined one of the network elements is transmitted to the network simulator. A performance of the communications network is simulated in response to the device state images modified by the prospective network element failovers given the device configurations. It is then detected whether an acceptable performance is maintained in view of the prospective network element load and performance levels after failover. Thus, a predictive analysis can be performed in order to determine whether an SLA would be violated in view of potential failovers or errors with a given network configuration. When it is found that an SLA violation may occur, failover settings may be re-shuffled (i.e., reset) to a new configuration that avoids the potential SLA violations.

In the case of network maintenance, a re-convergence action may be pro-actively initiated to prevent outages. Effectively, the process is the same as above except that when the simulation determines that the failover plan is acceptable, it may format and send a simulated device failure message to a network manager in order to stimulate the re-convergence action before the users experience an outage. Since no element failure has occurred yet, paths that haven't been re-routed yet will not experience an outage—even if the convergence action takes minutes or hours. Once all of the re-routing or re-convergence is completed, the maintenance can be performed without interruption to the applications.

BRIEF DESCRIPTION OF THE DRAWINGS

FIG. 3 is a diagram showing the contents of a device state image in one preferred embodiment.

FIG. 5 is a flowchart showing a preferred method of the invention.

DETAILED DESCRIPTION OF PREFERRED EMBODIMENTS

Figure 1:
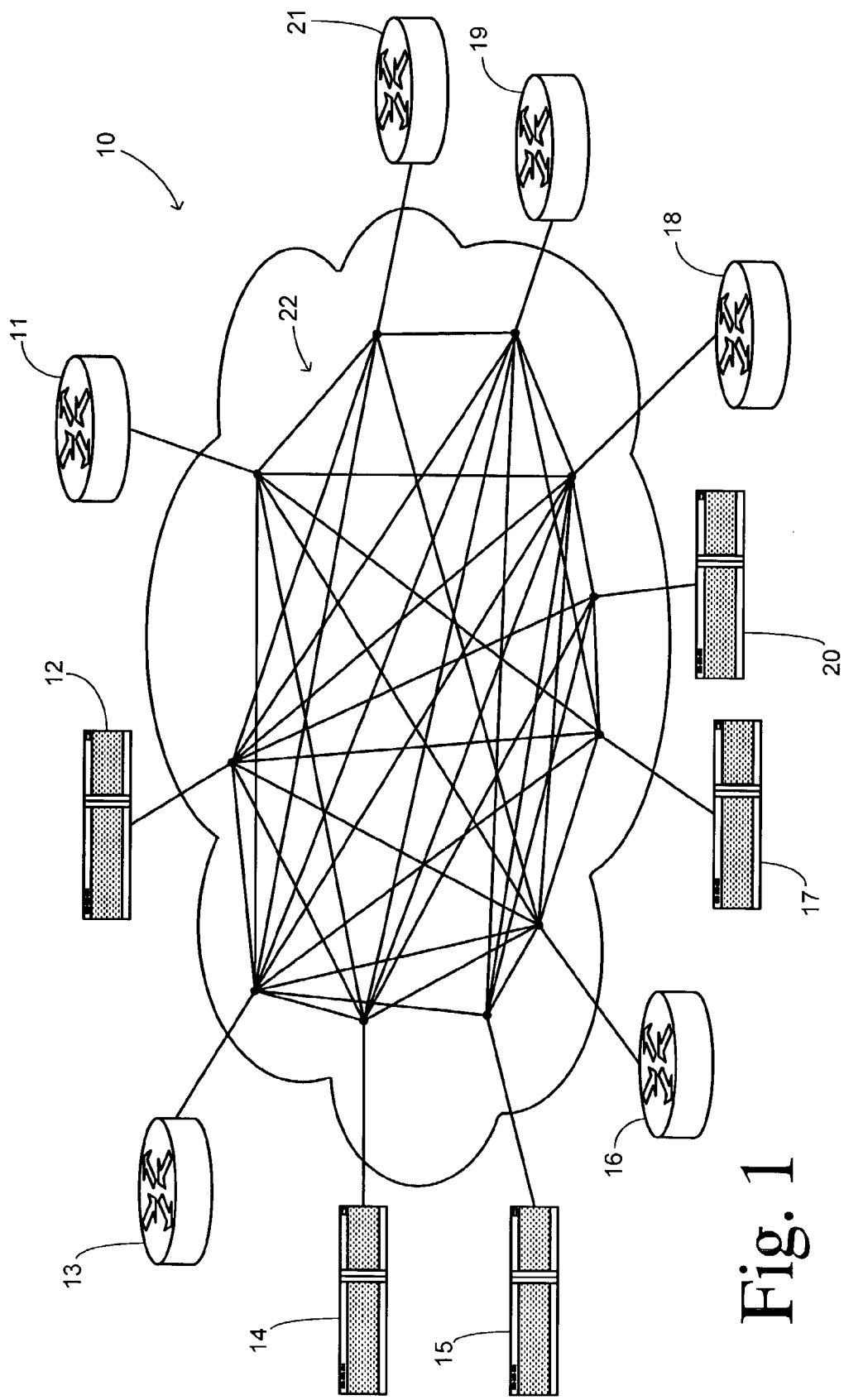
FIG. 1 is a block diagram showing an example meshed network and failover devices.

Referring to FIG. 1, an example of a meshed network 10 includes a plurality of routers 11-21. Meshed interconnections 22 create a network topology that provides many redundant communication paths between two nodes in the network, resulting in resilient data transport. Network 10 may be an IP network or an optical network, for example.

When a router 11-21 fails or is removed from the network for maintenance, the network is reconfigured so that the remaining devices take its place. The network devices may be grouped so that data paths using a direct link between routers 19 and 21 are re-routed to links (resources) between 19 and 12, and 12 and 21, for example. If two or more routers within the same group attempt to switch over to the same failover resources during the same time period, then the switchover may fail for one or all devices or congestion may result at the devices providing the failover resources thereby significantly degrading network performance. Due to the complexity of the network interconnections, however, it has not been possible to predict the impact on network performance of removing a device from service to perform maintenance.

Figure 2:
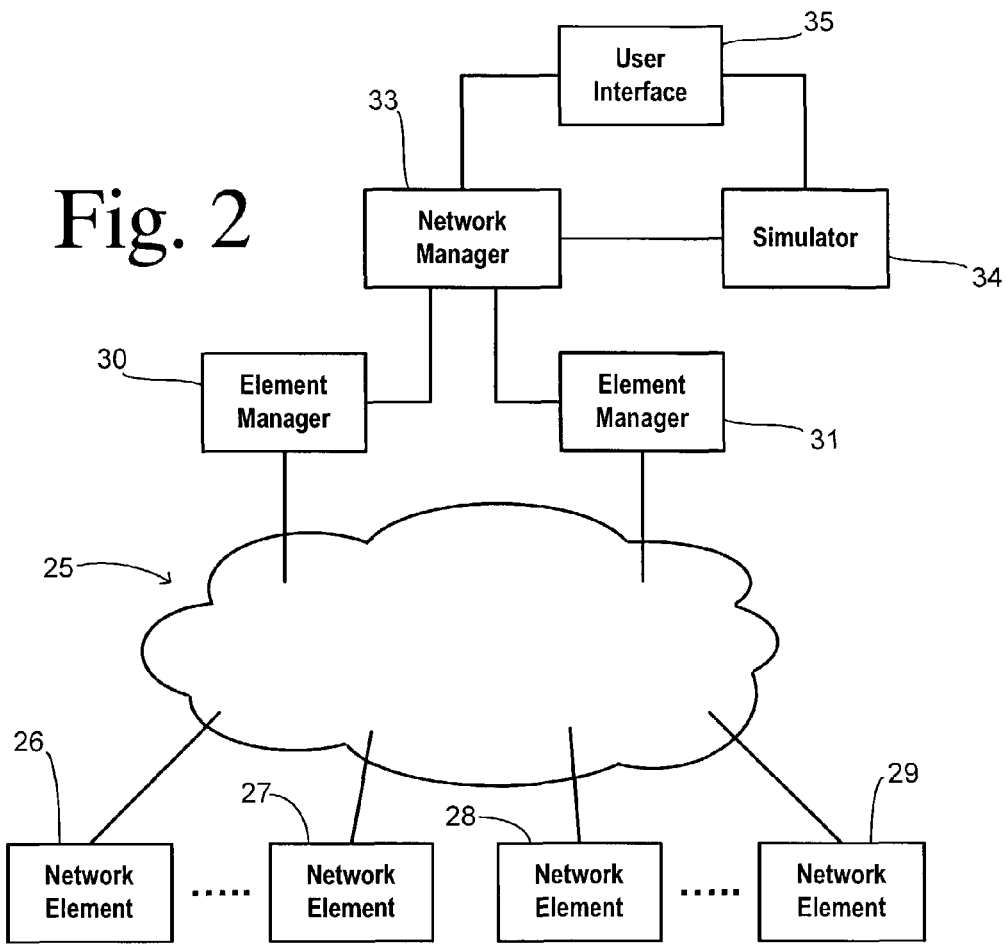
FIG. 2 is a block diagram showing a network architecture according to a preferred embodiment of the present invention.

FIG. 2 shows a network architecture of the present invention for overcoming the foregoing disadvantages of the prior art. A network 25 includes network elements 26-29 which may be comprised of routers, switches, bridges, or any other network elements. Element manager applications 30 and 31 are coupled to network 25 and perform various management functions for monitoring and controlling respective ones of the network elements 26-29 as is well known in the art. A typical network would include a much greater number of network elements and element managers than shown in FIG. 2 but would be connected in the same fashion. Element managers 30 and 31 interact with network elements 26-29 using network management protocols including TL1, CMIP, CORBA, SNMP, or others.

Element managers 30 and 31 are coupled to a network manager application 33 for consolidating and analyzing data from the element managers and for determining any configuration changes that should be made in the network. Network manager 33 may be comprised of the Conscious™ traffic engineering system available from Zvolve Systems, Inc., for example, or other network level tools.

The present invention employs a simulator 34 coupled to network manager 33 and to a user interface 35. Simulator 34 generates a network model for predicting network performance based on actual and prospective (i.e., hypothetical or potential) states of the network elements. User interface 35 allows a network operator or other user to review the network model, to obtain predictions based on prospective actions and modifications of the network elements, and to implement modifications in the network element configurations (via known Network Manager functionality).

Improved network monitoring of the present invention employs a device state image 36 as shown in FIG. 3. The element managers construct a respective device state image 36 for each network element in their domains. Preferably, each device state image identifies a device type (e.g., router or switch, together with the manufacturer and model of the device), device status (e.g., working properly or not), link status (e.g., to which other nodes it is actively connected), loading level, failover settings (e.g., identity of links to which traffic will be switched upon failure of the specified link), and failover type (e.g., designators for "least cost route" algorithms, pre-configured failover routes, a "don't failover" setting, and/or path priority values). Each device state image is constructed with information from the element managers that is transmitted to the simulator via the network manager, for example.

Figure 4:
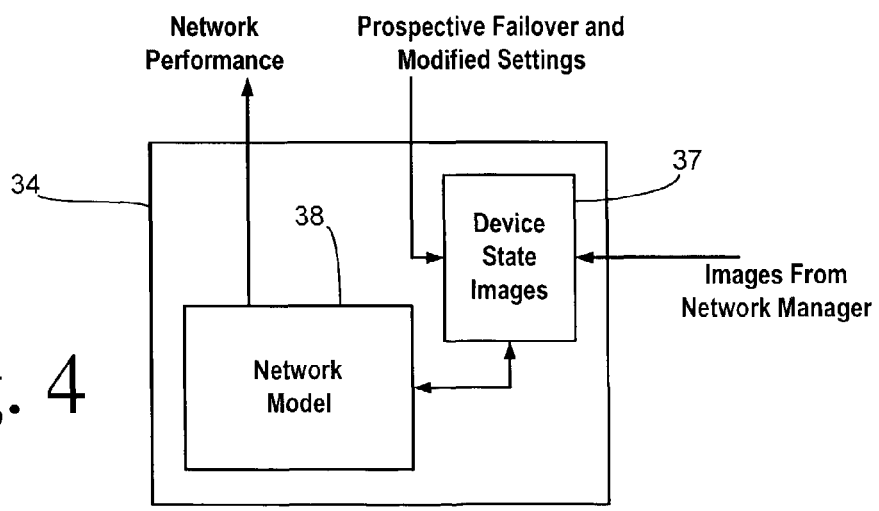
FIG. 4 is a block diagram showing the simulator of FIG. 2 in greater detail.

Simulator 34 is shown in greater detail in FIG. 4. Device state images from the network manager are stored in a database 37. Based on the device state to images, a network model 38 is created which provides various outputs such as a network performance output that identifies throughput and response time estimates, for example. Database 37 also receives prospective failover events (e.g., a potential change of device status of one or more devices to offline in order to predict the effects of removing the devices for maintenance) and hypothetical modified settings (e.g., a substitute failover setting for a device when a prediction suggests a problem will occur with the current settings) to be used in further simulations as commanded via the user interface. Simulator 34 may be comprised of conventional network simulation tools such as OPNET Modeler® from OPNET Technologies, Inc., or a second "offline" copy of Zvolve Conscious™ for example. It may be simpler to use a secondary copy of Zvolve Conscious™ since the data feeds and configurations are already compatible.

A preferred method of the present invention is shown in FIG. 5. In step 40, the element managers construct a device state image for each network element. The device state images are transmitted to the network manager and then to the simulator in step 41. Collection of device state images may be initiated by a user whenever a network simulation and/or evaluation of a planned maintenance action is desired. Alternatively, the network manager and element managers may be configured to periodically collect and update device state images for storage by the simulator.

In step 42, the simulator creates a network model and preferably simulates the current network performance as a baseline for comparing the effects of prospective changes to the device state images. Performance may be estimated as an average throughput or an average response time, for example. It may be desirable in the present invention to compare the estimated values with performance metrics required by a service level agreement (SLA) in order to detect potential nonconformance with the SLA, especially in deciding whether the impact of a prospective change is acceptable.

In step 43, one or more network elements are chosen for which maintenance actions are desired. Prospective failovers of the chosen devices are transmitted from the user interface to the simulator. Network performance is re-simulated in step 44 using the modified device state images for the chosen network elements together with changes in the network links resulting from a switchover to the failover devices. In other words, the device status of the chosen network element to be serviced is changed to offline and the link status of any affected devices are updated within the re-simulation.

A check is made in step 45 to determine whether network performance is acceptable. This may be determined by comparing the estimated performance with predetermined fixed performance levels. Alternatively, the difference between the baseline estimates and the new estimates can be compared to a threshold, with a difference below the threshold being acceptable and a difference above the threshold being an unacceptable change in performance. If performance is acceptable, then the chosen network element(s) are taken down for maintenance in step 46, thereby causing network traffic to switch to the failover devices. Maintenance actions are completed in step 47, and then the network elements are restored to a desired configuration (e.g., back to their original configuration or to another configuration).

If performance is found to be unacceptable in step 45, then an operator may choose a modified set of failover settings for one or more network elements in step 50. These potentially modified settings are evaluated by re-running the simulation in step 51 in an attempt to find an alternate network configuration in which acceptable network performance can be maintained while the chosen devices are taken down for maintenance. The potential modifications may be input by an operator via the user interface based on the operator's knowledge of the network and the results of simulations already performed. A check is made in step 52 to determine whether the maintenance action(s) could be performed on the hypothetically modified network while still maintaining acceptable performance. If not, then a return is made to step 50 to try different modifications to the failover settings. If step 52 determines that the modified failover settings do produce acceptable performance, then the new failover settings are transmitted to the affected network elements in step 53 via the network manager and the chosen network element is taken down for maintenance in step 46.

As demonstrated by the foregoing description, an inventive solution has been provided wherein data about network elements including their failover settings is collected at the element manager level, device state images are constructed and transmitted to a simulator, a potential resource change is transmitted to the simulator, a change in the network state or performance is determined by the simulator, and any necessary responsive action to the change is determined before the change occurs. The simulation allows a network operator to know in advance the result on network performance of initiating a specific maintenance action in the current network state. Further interactions or changes in network performance resulting from simultaneous fault conditions in network elements and maintenance actions in other network elements are made visible to the network operator, allowing countermeasures or mitigating actions to be taken.

Although FIG. 5 has described the invention in connection with performing maintenance actions on chosen network elements, the foregoing method and apparatus are also useful for evaluating network performance changes in response to failovers caused by device failures alone, whereby more robust network configurations may be identified.

What is claimed is:

1. A method of predicting re-routing interactions in a communications network including a plurality of network elements, said method comprising the steps of:
    constructing a respective device state image for each of said plurality of network elements, each of said device state images including a failover setting of a respective one of said network elements;
    transmitting said device state images to a network simulator;
    simulating a performance of said communications network in response to said device state images using a predictive network performance model in said network simulator;
    transmitting a prospective network element failover of a predetermined one of said network elements to said network simulator;

simulating a performance of said communications network in response to said device state images using said predictive network performance model modified by re-routing that would result from said prospective network element failover; and detecting whether an acceptable performance is maintained in view of said prospective network element failover.

2. The method of claim 1 wherein if an acceptable performance change is not detected then said method further comprising the steps of:

modifying selected ones of said failover settings in respective ones of said device state images and re-simulating said performance in order to identify a set of modified failover settings that achieve said acceptable performance; and updating a failover setting of at least one of said network elements in response to said set of prospective failover settings.

3. The method of claim 2 further comprising the steps of:

activating said failover setting of said predetermined one of said network elements; and performing a maintenance action on said predetermined one of said network elements.

4. The method of claim 3 wherein a plurality of prospective failovers of respective network elements are transmitted to said network simulator to determine whether a corresponding plurality of maintenance actions can be carried out simultaneously.

5. The method of claim 1 wherein each device state image further includes a respective device type, a respective load value, a respective link status, and a respective device status.

6. The method of claim 1 wherein said communication network is comprised of a meshed optical network.

7. The method of claim 1 wherein said communication network is comprised of an IP network.

8. Apparatus comprising:

a plurality of network elements interconnected in a communications network;

an element manager coupled to said plurality of network elements for collecting respective device state images from each respective one of said network elements, each device state image including a failover setting of a respective one of said network elements;

a simulator coupled to said element manager for generating a predictive network performance model in response to said device state images and determining a network performance of said communications network; and a user interface for transmitting a prospective network element failover of a predetermined one of said network elements to said network simulator;

wherein said simulator simulates a performance of said communications network in response to said predictive network performance model modified by re-routing that would result from said prospective network element failover.

9. The apparatus of claim 8 further comprising:

a plurality of element managers, each element manager adapted to interface with a respective group of said network elements; and a network manager coupled to said plurality of element managers and said simulator for collecting said device state images from said element managers and transmitting said device state images to said simulator.

10. The apparatus of claim 8 wherein said user interface further transmits prospective modified failover settings for respective network elements to said simulator for modifying said network model to simulate a hypothetical network configuration including said prospective network element failover.

11. The apparatus of claim 9 wherein said user interface further transmits prospective modified failover settings for respective network elements to said simulator for modifying said network model to simulate a hypothetical network configuration including said prospective network element failover, and wherein said network manager is responsive to said user interface for transmitting said prospective modified failover settings to said respective network elements for updating said respective network elements prior to a maintenance action on said predetermined one of said network elements.

12. The apparatus of claim 8 wherein each device state image further includes a respective device type, a respective load value, a respective link status, and a respective device status.

13. The apparatus of claim 8 wherein said communication network is comprised of a meshed optical network.

14. The apparatus of claim 8 wherein said communication network is comprised of an IP network.

* * * * *